United States Patent [19]
Land

[11] 3,800,309
[45] Mar. 26, 1974

[54] EXPOSURE, VIEWING AND FOCUSING SYSTEM

[75] Inventor: Edwin H. Land, Cambridge, Mass.

[73] Assignee: Polaroid Corporation, Cambridge, Mass.

[22] Filed: Oct. 2, 1972

[21] Appl. No.: 294,252

[52] U.S. Cl. .................................... 354/152
[51] Int. Cl. .................................... G03b 19/12
[58] Field of Search ............... 95/42, 11 V, DIG. 2

[56] References Cited
UNITED STATES PATENTS

| | | | |
|---|---|---|---|
| 3,672,281 | 6/1972 | Land | 95/42 |
| 3,656,421 | 4/1972 | Ataka | 95/42 |
| 3,498,198 | 3/1970 | Fujii | 95/42 |

*Primary Examiner*—Samuel S. Matthews
*Assistant Examiner*—E. M. Bero

[57] ABSTRACT

An exposure, viewing and focusing system for a camera utilizing a primary objective lens for all three functions and including a fixed, planar, semitransparent reflector for directing light from the objective lens toward a viewing plane, and a reflecting element having opposed reflecting surfaces movable between an exposure position adjacent the fixed reflector and a viewing position adjacent an exposure plane. One reflecting surface directs light from the lens toward the exposure plane when in the exposure position and the opposite surface is adapted, in the viewing position, to form an image which is visible through the semitransparent reflector.

13 Claims, 2 Drawing Figures

PATENTED MAR 26 1974    3,800,309

EXPOSURE, VIEWING AND FOCUSING SYSTEM

BACKGROUND OF THE INVENTION

1. Field of the Invention

This invention relates to camera exposure systems.

2. Description of the Prior Art

Two types of single (objective) lens exposure and viewfinder systems have been proposed and are well known in the art. These include the so-called single lens reflex camera incorporating a movable mirror. In one position described as the viewing and focusing position, the mirror is located in the path of light from the objective lens to the exposure plane and functions to redirect the light to an image-forming system including a viewing and focusing screen. In the exposure position, the mirror is located out of the path of light from the lens to the exposure plane a which the photosensitive medium is located.

The other type of exposure, viewing and focusing system utilizing the same primary objective lens to perform these three functions is represented, for example, by the U. S. Pat. of David S. Grey, No. 2,914,997, dated Dec. 1, 1959. In this system, the viewing and focusing screen itself is moved between a viewing position in which the screen is located closely adjacent the exposure plane and an exposure position out of the light path between the objective lens and exposure plane. This latter system has been proposed primarily for larger picture format cameras, while the use of the former system has been largely limited to relatively small picture format cameras.

Mirrors have been incorporated to advantage in the exposure systems of cameras particularly of the relatively larger picture format type. In such cameras, the mirror, or mirrors, have been employed to alter or "fold" the light path between the objective lens and exposure plane to achieve the advantage of compactness and where required, image reversal. Such a mirror, being an essential part of the exposure system, can be considered to be fixed with respect to the other components of the exposure system, at least when the camera is in readiness for use, but does not constitute a component of the viewing and/or focusing system.

SUMMARY OF THE INVENTION

The instant invention relates to a camera having a novel and improved exposure, viewing and focusing system which utilizes the primary objective lens for both exposure and viewing functions, a movable reflecting element as a component of both the exposure system and the viewing and focusing system, and a stationary reflecting member which functions as a component of the viewing and focusing system.

The reflecting element includes a planar reflecting surface on one side thereof and on the opposite side thereof a reflecting surface, e.g., an echelon mirror which functions as a component of the camera's viewing system. The reflecting element is pivotally mounted for movement between an exposure position wherein the planar reflecting surface redirects light from the lens to a photosensitive element located in position for exposure, and a focusing and viewing position wherein the planar reflecting surface is located adjacent to the exposure plane of the camera and in lighttight relation with a photosensitive element and the echelon mirror is located in a focusing and viewing plane. When the reflecting element is located in the aforementioned focusing and viewing position, light from the scene being photographed is admitted into the interior of the camera by the lens and then redirected by a stationary or fixed member having a semitransparent reflecting surface toward the echelon mirror. The image on the echelon surface is viewed through the semitransparent reflecting surface by an appropriately placed eyepiece. After the image has been properly focused, the shutter is closed and the reflecting element is pivoted into its exposure position. The shutter is again opened and then closed to expose a photosensitive element located in position for exposure. Subsequent to exposure, the exposed photosensitive element is advanced into the bite of a pair of power driven rollers which in turn rupture a pod of processing liquid located near the leading end of the photosensitive element and spread the contents thereof across the photosensitive element to initiate the formation of a visible image, as is well known in the art. The photosensitive element is then advanced to the exterior of the camera. Also, subsequent to exposure, the reflecting element is pivoted into the viewing and focusing position prior to exposure of the next photosensitive element.

An object of the invention is to provide a novel exposure and viewing/focusing system utilizing a movable reflecting element as a component of both the exposure system and the viewing and focusing system and a fixed reflecting member as a component of the viewing and focusing systems.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWING

For a fuller understanding of the nature and objects of the invention, reference should be had to the following detailed description taken in connection with the accompanying drawing wherein.

DETAILED DESCRIPTION OF THE INVENTION

Figure 1:
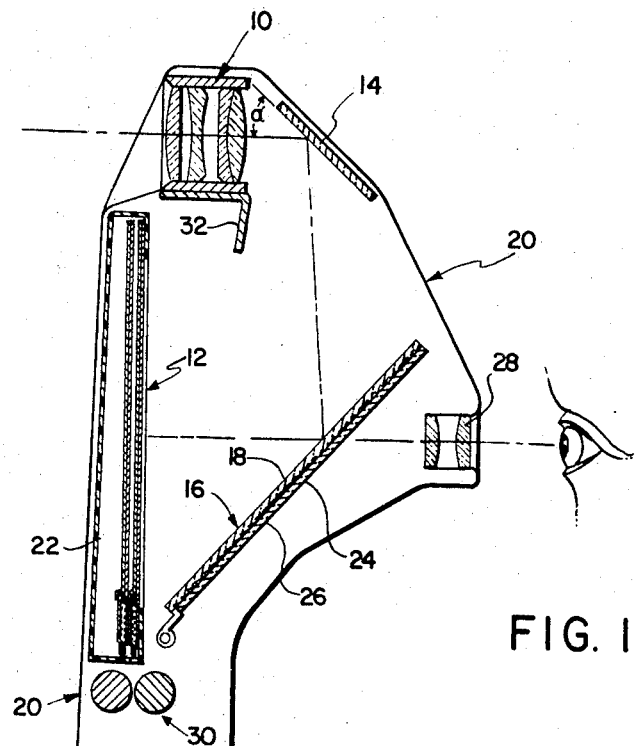
FIG. 1 is a somewhat schematic, sectional view of a camera incorporating the exposure, viewing and focusing system of the invention shown with the components thereof in position for exposure.
Figure 2:
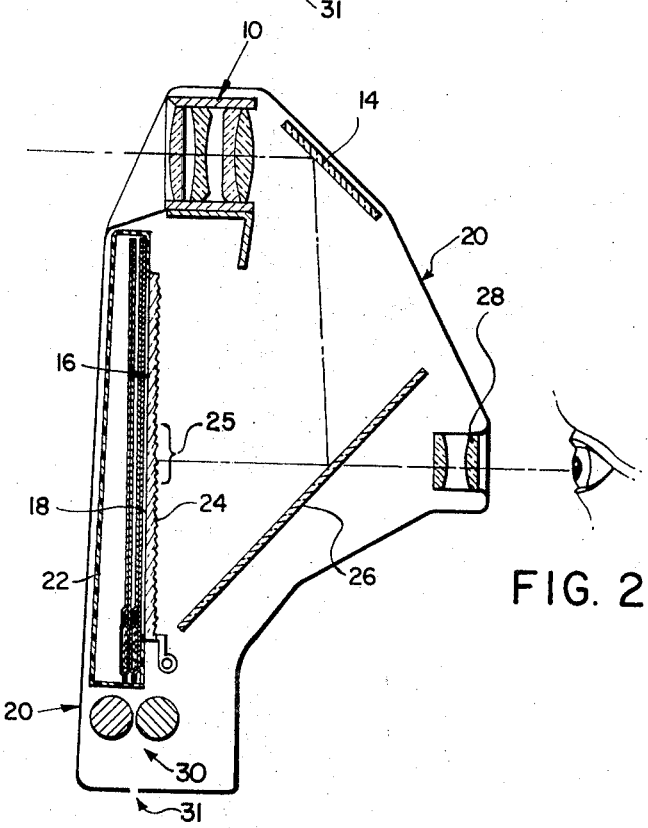
FIG. 2 is a view similar to FIG. 1, showing the exposure, viewing and focusing system with the components thereof in position for viewing and focusing.

The basic components of the exposure, viewing and focusing system of the invention are illustrated in FIGS. 1 and 2 of the drawing as including an objective lens 10, designed to form a real image at an exposure plane designated 12 located a predetermined distance from the lens along the folded path of the axis thereof. Lens 10 is preferably of the variable focus type and is, or includes, components, movable axially relative to the exposure plane for changing the focus of the lens in accordance with the camera-to-subject distance. Lens 10, its mounting and means for varying the focus of the lens are conventional and so well known in the art as to require the omission of the details thereof from this disclosure. An equally conventional and well known type of variable aperture and shutter will also be associated with the lens for controlling exposures.

The exposure plane is illustrated as being flat or planar, or it may be curved if desired, and is located perpendicular to the lens axis with one edge adjacent the lens. In the form of a camera shown, the exposure system includes a pair of mirrors having reflecting surfaces for deviating the light path through a total angle of the order of 180°. The mirrors include a first mirror 14 mounted at a fixed position behind lens 10 and having a planar reflecting surface which forms an angle $\alpha$ with the lens axis (in the plane shown) of approximately 40° to 45°, so as to deflect the axial ray at a small acute angle away from the plane of the exposure plane. Alternatively, the reflecting surface of mirror 14 can be located at an angle of 45° or more with respect to the lens axis so as to deflect the axial ray parallel with or toward the plane of the exposure plane.

A movable mirror, designated 16, having a planar reflecting surface 18 is located when in the exposure position of the mirror shown in FIG. 1, with surface 18 disposed at an angle with respect to the plane of the exposure plane in position to deflect light from mirror 14 toward exposure plane 12. The angle at which reflecting surface 18 is located in exposure position is, of course, dependent upon the angle of mirror 14 relative to the lens axis and in the embodiment shown is between 40° and 45°. In an alternative embodiment the reflecting surface of mirror 14 and reflecting surface 18 could be arranged at 90° with respect to one another and at 45° with respect to the lens axis and exposure plane.

It should be appreciated that where only a single reflection and image reversal are desired, mirror 14 may be omitted and the arrangement of lens 10, reflecting surface 18 and exposure plane 12, and the camera structure may take a form similar to that shown in U.S. Pat. No. 3,672,281 granted to Edwin H. Land on June 27, 1972 or U.S. Pat. No. 3,683,770 granted to Edwin H. Land et al. on Aug. 15, 1972. Still another arrangement of two mirrors to provide a compact camera structure in which the present invention can find utility is shown and described in the U.S. Pat. of Edwin H. Land, No. 2,834,269, dated May 13, 1958.

The exposure and viewing system of the invention is designed for incorporation in a hand-held camera including a housing designated 20 for supporting and enclosing the optical components of the system as well as enclosing and locating a photosensitive element in position for exposure at exposure plane 12. Alternatively, the housing shown can be adapted for coupling with a camera "back" or film holder designed to position the film for exposure and/or process the exposed film in which case the "back" will be located at the front or side of the camera facing the subject rather than at the rear of the camera as in more conventional structures. The cameras shown and described in the aforementioned Land patents are of the self-developing type and the housing disclosed herein is designed to hold and support in position for exposure, a container 22 of self-developing film units of the type described and claimed in U.S. Pat. No. 3,594,164 (double reflection) and U.S. Pat. No. 3,415,644 (single reflection). The housing also includes space for accommodating means (not shown) for advancing the film unit following exposure thereof. The housing will also comprise appropriate baffles for preventing internal reflections, including a baffle 32 located adjacent lens 10 for preventing light outside of the cone of image-forming rays from being reflected from mirror 14 to a photosensitive element located at exposure plane 12.

Reflecting element 16 is mounted adjacent the edge of exposure plane 12 furthest from lens 10 for pivotal movement between the exposure position shown in FIG. 1 and the viewing position shown in FIG. 2 in which the oppositely facing reflecting surface 24 of reflector 16 is located closely adjacent exposure plane 12 and functions as a component of the viewing and/or focusing system. A reflector 26 having a semitransparent reflecting surface is mounted in fixed position within housing 20 with its reflecting surface located closely adjacent reflecting surface 24 when the movable reflector is in exposure position. Reflector 26 is designed to function in the same manner as reflecting surface 18 and redirect light from reflector 14 toward reflecting surface 24 of movable reflector 16 when the latter is in viewing position so that lens 10 forms an image on reflecting surface 24. This latter image is intended to be viewed by the operator and for this purpose, a suitable optical system of a conventional type including, for example, an eyepiece 28, is provided for receiving light from reflecting surface 24 transmitted via the semitransparent reflecting surface of reflector 26. In instances where reversion and/or inversion of the image formed at reflecting surface 24 is desired or required, a suitable prism system may be incorporated between the eyepiece and reflector 26.

Reflecting surface 24 may be formed with a matt finish so that a visible image is formed by lens 10 at the reflecting surface. However, it will be appreciated that there will be some light loss due to the fact that the reflecting surface of reflector 26 is semitransparent and accordingly, reflecting surface 24 is formed to collect and redirect incident light toward eyepiece 28 and thereby enhance the brilliance of the image visible to the operator. A suitable surface for this purpose is an echelon mirror such as disclosed and described in the aforementioned Grey patent, consisting of a multiplicity of circular zones or echelons each comprising a small segment of a concave spherical reflecting surface and designed to function in combination as a field lens for directing light toward eyepiece 28. The echelon mirror, sometimes termed a Fresnel mirror, has the advantages of functioning as a concave, three-dimensional reflector while the reflecting surface or surfaces themselves are located substantially in a plane and have a relatively small depth dimension.

The reflecting surface 24 also includes focusing means of a conventional type. This focusing means is preferably located at or near the center of reflecting surface in a zone designated 25 intersected by the axial ray and may include, for example, one of the well known types of focusing screens designed to form a clear image only when the objective lens is correctly focused. Such a surface may include, for example, microprisms with either matt or smooth surfaces. Another type of focusing system may be of the split field type designed to produce two images which are aligned or in coincidence only when the camera lens is in focus and comprising, for example, a pair of wedges mounted in zone 30 with the dividing line between the wedges contiguous with the point of incidence of the axial ray. The aforementioned microprisms operate according to the same principle in that the microprisms form two images when the lens is out of focus so that the image of the scene appears to be fuzzy and unclear.

In an alternative embodiment, reflecting surface 24 may be formed in its entirety as a focusing screen, for example, of the microprism type.

The operation of the camera is similar in many respects to that of the conventional single lens reflex camera in which the shutter is open when the movable mirror is in viewing position. When an exposure is to be made, the shutter closes, mirror 16 moves into exposure position, the shutter opens and closes to make the exposure, the exposed photosensitive element is then advanced into the bite of a pair of driven rollers 30 for subsequent delivery to the user via slot 31, the mirror then returns to the viewing position and the shutter reopens to permit viewing and focusing. The mechanisms for performing these functions as well as focusing the lens are well known and are well within the skill of a mechanic in the art to construct.

It will be appreciated from the foregoing that the exposure, viewing and focusing system of the present invention incorporates the advantages of both a single lens reflex camera and focal plane viewing sometimes found in larger format cameras. This is achieved in large part by virtue of the novel and unobvious expedient of employing a movable reflecting element as a component of an exposure system and as a component of a viewing and focusing system. Moreover, the exposure, viewing and focusing system lends itself to substantial modification without departing from the basic inventive concepts which provide its substantial advantages and may be incorporated in cameras having overall structures differing substantially from the structure disclosed herein by way of example.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. In an exposure and viewing system for a camera comprising an objective lens for forming an image at an exposure plane, the improvement comprising, in combination:

first reflecting means having first and second reflecting surfaces;

said first reflecting means being mounted for movement between a viewing position in which said first reflecting surface is located closely adjacent said exposure plane in position to reflect light from said lens incident on said first reflecting surface and prevent exposure of a photosensitive element at said exposure plane and an exposure position wherein said second reflecting surface is disposed at an angle with respect to said exposure plane for directing light from said lens toward said exposure plane to expose a photosensitive element at said exposure plane;

second reflecting means for directing light from said lens toward said first reflecting surface, said second reflecting means being capable of passing light therethrough; and means for viewing through said second reflecting means an image formed by said objective lens at said first reflecting surface when said first reflecting means is in said viewing position.

2. An exposure and viewing system as defined in claim 1 wherein said second reflecting means includes a planar, semitransparent reflecting surface located closely adjacent said first reflecting surface of said first reflecting means in said exposure position thereof, said semitransparent reflecting surface being located in position for directing light from said objective lens toward said one reflecting surface when said first reflecting means is in said viewing position.

3. An exposure and viewing system as defined in claim 2 wherein said first reflecting surface comprises a multiplicity of concave sections which combine to act as a field lens for directing light from said objective lens to said viewing means when said first reflecting means is in said viewing position.

4. An exposure and viewing system as defined in claim 3 wherein said first reflecting surface includes focusing means comprising light deviating elements.

5. An exposure and viewing system as defined in claim 1 wherein said first reflecting surface includes a focusing screen at which an image is formed by said objective lens when said first reflecting means is in said viewing position.

6. An exposure and viewing system as defined in claim 5 wherein said first and second reflecting surfaces of said first reflecting means are located substantially in parallel planes.

7. An exposure and viewing system as defined in claim 1 wherein said first reflecting surface is an echelon mirror.

8. An exposure and viewing system as defined in claim 1 wherein said first reflecting surface comprises a multiplicity of minute concave sections arranged substantially in a plane adjacent to said exposure plane when said first reflecting means is in said viewing position and which combine to act as a concave reflecting surface.

9. An exposure and viewing system as defined in claim 8 wherein said first and second reflecting surfaces of said first reflecting means are located substantially in parallel planes.

10. An exposure and viewing system as defined in claim 8 wherein said first reflecting surface includes focusing means comprising light deviating elements.

11. An exposure and viewing system as defined in claim 8 wherein said second reflecting surface is planar.

12. An exposure and viewing system as defined in claim 1 further including third reflecting means for directing light from said lens onto said second reflecting means when said first reflecting means is in said viewing position and for directing light from said lens onto said second reflecting surface when said first reflecting means is in said exposure position.

13. An exposure and viewing system as defined in claim 1 further including third reflecting means, said third reflecting means functioning as a component of said viewing system when said first reflecting means is in said viewing position and as a component of said exposure system when said first reflecting means is in said exposure position.

* * * * *